(12) United States Patent
Oku et al.

(10) Patent No.: US 9,815,424 B2
(45) Date of Patent: Nov. 14, 2017

(54) BUMPER DEVICE FOR AUTOMOBILE

(71) Applicants: Toray Carbon Magic Co., Ltd., Maibara-shi (JP); Toray Industries, Inc., Tokyo (JP)

(72) Inventors: Akiyoshi Oku, Maibara (JP); Masanobu Nagasaki, Maibara (JP); Hiroki Wakabayashi, Nagoya (JP)

(73) Assignees: Toray Carbon Magic Co., Ltd. (JP); Toray Industries, Inc. (JP)

( * ) Notice: Subject to any disclaimer, the term of this patent is extended or adjusted under 35 U.S.C. 154(b) by 0 days.

(21) Appl. No.: 14/772,081

(22) PCT Filed: Mar. 6, 2014

(86) PCT No.: PCT/JP2014/055713
§ 371 (c)(1),
(2) Date: Sep. 2, 2015

(87) PCT Pub. No.: WO2014/136858
PCT Pub. Date: Sep. 12, 2014

(65) Prior Publication Data
US 2016/0001723 A1 Jan. 7, 2016

(30) Foreign Application Priority Data
Mar. 7, 2013 (JP) .................. 2013-045346

(51) Int. Cl.
*B60R 19/00* (2006.01)
*B60R 19/18* (2006.01)
(Continued)

(52) U.S. Cl.
CPC .............. *B60R 19/18* (2013.01); *B60R 19/03* (2013.01); *B60R 19/30* (2013.01); *B60R 2019/1853* (2013.01)

(58) Field of Classification Search
CPC .......... B60R 19/18; B60R 19/03; B60R 19/30
(Continued)

(56) References Cited

U.S. PATENT DOCUMENTS 4,457,547 A * 7/1984 Sekiyama ............... B60R 19/18
 293/110
4,525,005 A 6/1985 Prochaska et al.
(Continued)

FOREIGN PATENT DOCUMENTS

DE 102010015972 9/2011
EP 0 108 870 5/1984
(Continued)

OTHER PUBLICATIONS

Supplementary European Search Report dated Sep. 16, 2016, of corresponding European Application No. 14761092.7.
(Continued)

*Primary Examiner* — Joseph D Pape
(74) *Attorney, Agent, or Firm* — DLA Piper LLP (US)

(57) ABSTRACT

A bumper device for an automobile includes a bumper beam consisting of a fiber-reinforced resin and bumper extensions which consist of a fiber-reinforced resin. The bumper device for an automobile is characterized in that the bumper beam has a Θ-shaped cross-section and in that the bumper beam and the bumper extensions are molded integrally. The bumper device for an automobile has desirable strength and rigidity and is capable of exhibiting excellent energy absorption performance when a large load is inputted to the bumper beam.

11 Claims, 6 Drawing Sheets

(51) Int. Cl.
*B60R 19/03* (2006.01)
*B60R 19/30* (2006.01)

(58) Field of Classification Search
USPC .................................................. 293/102, 120
See application file for complete search history.

(56) References Cited

U.S. PATENT DOCUMENTS

| | | | |
|---|---|---|---|
| 5,271,650 A | | 12/1993 | Fukuhara et al. |
| 5,290,079 A | * | 3/1994 | Syamal .................. B29C 70/48 264/257 |
| 5,788,297 A | | 8/1998 | Sugawara et al. |
| 6,286,879 B1 | * | 9/2001 | Haque .................... B60R 19/03 293/102 |
| 8,919,834 B2 | * | 12/2014 | Freundl .................. B60R 19/18 293/133 |
| 2004/0135382 A1 | | 7/2004 | Sakuma et al. |
| 2005/0269823 A1 | | 12/2005 | DeVoursney et al. |
| 2010/0109354 A1 | | 5/2010 | Agrahari et al. |
| 2012/0306222 A1 | * | 12/2012 | Choi ....................... B60R 19/03 293/120 |
| 2015/0061320 A1 | * | 3/2015 | Yabu ....................... B60R 19/18 296/187.1 |

FOREIGN PATENT DOCUMENTS

| | | |
|---|---|---|
| EP | 0 376 593 | 7/1990 |
| JP | 57-013353 | 1/1982 |
| JP | 02-231244 | 9/1990 |
| JP | 04-223105 | 8/1992 |
| JP | 11-334500 | 12/1999 |
| JP | 2000-052897 | 2/2000 |
| JP | 2004-148915 | 5/2004 |
| JP | 2006-218904 | 8/2006 |
| JP | 2008-001204 | 1/2008 |

OTHER PUBLICATIONS

International Search Report dated Mar. 26, 2014, of PCT/JP2014/055713, along with an English translation.

* cited by examiner

BUMPER DEVICE FOR AUTOMOBILE

TECHNICAL FIELD

This disclosure relates to a bumper device for an automobile and, specifically, to a bumper device for an automobile excellent in energy absorption performance and also capable of lightening in weight.

BACKGROUND

So far, since the performance required for a bumper device for an automobile has been maintaining of a vehicle body at the time of a light collision (for example, 4 km/h pendulum impact test of U.S. PART 581), increasing the strength of the bumper device has been a main subject.

However, to comply with regulations such as one with respect to vehicle body damage at the time of 8 km/h pole, barrier collision test represented by the standard of U.S. Insurance Institute for Highway Safety (IIHS) or one with respect to passenger protection at the time of 55 km/h full lap collision test represented by the standard of JNCAP (Japan New Car Assessment Program), by having not only a strength but also an excellent crush (crush by applying pressure) property, an excellent material and structure is also required for energy absorption performance.

For this, the following countermeasures are employed. For example, a structure wherein a foamed material is filled in a bumper device (for example, JP-A-11-334500), a structure wherein an upper wall and a lower wall are formed to be inclined and these walls are structured to be able to buckled (for example, JP-A-2006-218904), a structure wherein a thickness of an intermediate rib is set to be larger than that of upper and lower ribs so that the formation of buckling or deformation becomes a specified formation (for example, JP-A-2004-148915), and a structure wherein a crush prevention body is disposed in a hollow portion of a bumper reinforcing material to be able to prevent sectional deformation and buckling and to give a rigidity (for example, JP-A-2000-52897), are known.

To adequately perform passenger protection at a time of being applied with a collision load, etc., required are to have adequate strength and rigidity capable of coping with a load being applied toward the passenger side and, in addition, to absorb an energy of the load being applied, by a bumper device itself as effectively as possible. In the above-described conventional structures, however, both of giving adequate strength and rigidity and giving excellent energy absorption performance are not always achieved.

Accordingly, it could be helpful to provide, in particular, a bumper device for an automobile which has desirable strength and rigidity while having a light-weight structure, and which can exhibit excellent energy absorption performance when a large load is inputted to a bumper beam.

SUMMARY

We thus provide:

A bumper device for an automobile including a bumper beam consisting of a fiber-reinforced resin and bumper extensions consisting of a fiber-reinforced resin, wherein the bumper beam has a $\Theta$-shaped cross-section and the bumper beam and bumper extensions are integrally molded.

The bumper device for an automobile including a bumper beam consisting of a fiber-reinforced resin and bumper extensions consisting of a fiber-reinforced resin, wherein the bumper beam has a $\Theta$-shaped cross-section and the bumper beam and bumper extensions are integrally molded, wherein the bumper beam further includes a unidirectional material aligned with reinforcing fibers in one direction and a member having a cloth material woven with reinforcing fibers.

The bumper device for an automobile including a bumper beam consisting of a fiber-reinforced resin and bumper extensions consisting of a fiber-reinforced resin, wherein the bumper beam has a $\Theta$-shaped cross-section and the bumper beam and bumper extensions are integrally molded, wherein the bumper beam further includes a unidirectional material aligned with reinforcing fibers in one direction and a member having a cloth material woven with reinforcing fibers, and wherein the unidirectional material is disposed at least at a bumper beam rear surface positioned at a vehicle body side so that an extending direction of reinforcing fibers becomes a vehicle width direction.

The bumper device for an automobile including a bumper beam consisting of a fiber-reinforced resin and bumper extensions consisting of a fiber-reinforced resin, wherein the bumper beam has a $\Theta$-shaped cross-section and the bumper beam and bumper extensions are integrally molded, wherein the bumper beam further includes a unidirectional material aligned with reinforcing fibers in one direction and a member having a cloth material woven with reinforcing fibers, and wherein the cloth material is disposed with an angle from a vehicle width direction at least at bumper beam front, upper and lower surfaces.

The bumper device for an automobile including a bumper beam consisting of a fiber-reinforced resin and bumper extensions consisting of a fiber-reinforced resin, wherein the bumper beam has a $\Theta$-shaped cross-section and the bumper beam and bumper extensions are integrally molded, wherein, in each of the bumper extensions, a unidirectional material aligned with reinforcing fibers in one direction is disposed continuously from the bumper beam.

The bumper device for an automobile including a bumper beam consisting of a fiber-reinforced resin and bumper extensions consisting of a fiber-reinforced resin, wherein the bumper beam has a $\Theta$-shaped cross-section and the bumper beam and bumper extensions are integrally molded, wherein the bumper beam further includes a unidirectional material aligned with reinforcing fibers in one direction and a member having a cloth material woven with reinforcing fibers, and wherein, in the bumper beam, the unidirectional material is disposed, in addition at a bumper beam rear surface positioned at a vehicle body side, also at a bumper beam front surface so that an extending direction of reinforcing fibers becomes a vehicle width direction.

The bumper device for an automobile including a bumper beam consisting of a fiber-reinforced resin and bumper extensions consisting of a fiber-reinforced resin, wherein the bumper beam has a $\Theta$-shaped cross-section and the bumper beam and bumper extensions are integrally molded, and wherein at least a part of reinforcing fibers used for the fiber-reinforced resins are carbon fibers.

EXPLANATION OF SYMBOLS

Figure 1A:
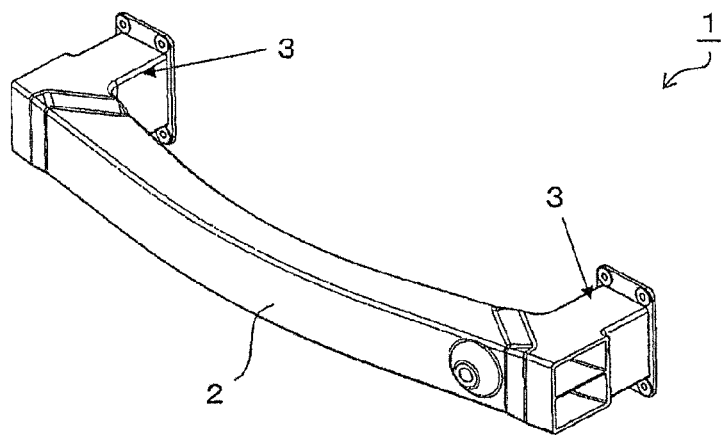
FIG. 1(A) and FIG. 1(B) show perspective views of an example of a bumper device for an automobile.

1: bumper device for an automobile
2, 7: bumper beam
3: bumper extension
4, 6, 8: unidirectional material
5: cloth material
11: sequential breakage portion

DETAILED DESCRIPTION

We provide a bumper device for an automobile that comprises a bumper beam which consists of a fiber-reinforced resin and bumper extensions which consist of a fiber-reinforced resin, and is characterized in that the bumper beam has a Θ-shaped cross-section and the bumper beam and the bumper extensions are molded integrally. The Θ-shape as the cross-sectional shape of the bumper beam means a shape wherein the outline shape of the cross-section of the bumper beam is a rectangle or approximate rectangle and a single wall extending over the portion between both side surfaces (also referred to as a portion forming an intermediate surface) is provided in the rectangle or approximate rectangle. This rectangle or approximate rectangle, which is the outline shape of the Θ-shape, means a concept including both a shape the respective corner portions of which are formed to be folded and a shape the respective corner portions of which have rounds.

In such a bumper device for an automobile, first, since the bumper device comprises the bumper beam which consists of a fiber-reinforced resin and the bumper extensions which consist of a fiber-reinforced resin, it can be lightened in weight as compared with one made of a metal or the like. By being integrally molded with these bumper beam and bumper extensions, it becomes possible to exhibit high strength and rigidity as a whole efficiently, a load inputted to the bumper beam is efficiently transmitted to a vehicle body side through the bumper extensions structured integrally with the bumper beam, and passenger protection is adequately performed. Then, since the bumper beam has a Θ-shaped cross-section, when a large load such as an impact load is inputted to the bumper beam, by having set the strengths of the respective portions of the Θ-shaped cross-section adequately, it becomes possible to deform it, without causing a large deformation in a bumper beam rear surface forming portion of the Θ-shaped cross-section positioned at a vehicle body side so that the bumper beam cross-section is crushed, for example, crushed by pressure, in a upper surface forming portion or a lower surface forming portion of the Θ-shaped cross-section which reaches to the bumper beam rear surface forming portion, and further, in an intermediate surface forming portion of the Θ-shape. As a result, when a large load is inputted from a front surface of the bumper beam, a sequential breakage is caused in the upper, intermediate and lower surface forming portions of the Θ-shaped cross-section of the bumper beam, and by the sequential breakage, it becomes possible to absorb energy extremely efficiently in the cross-section of the bumper beam. Therefore, by giving adequately high strength and rigidity to the bumper device as a whole, it becomes possible to well transmit the inputted load to the vehicle body side and to make the vehicle side having a larger rigidity (for example, a front side member) take in charge of the load to protect a passenger adequately, and when a larger load is inputted, it becomes possible to absorb energy efficiently within the cross-section of the bumper beam by the sequential breakage of the portion at a side opposite to the vehicle body side of the Θ-shaped cross-section of the bumper beam and, therefore, a bumper device for an automobile having an ideal function can be realized.

In the above-described bumper device for an automobile, it is preferred to employ a structure wherein the above-described bumper beam comprises a unidirectional material aligned with reinforcing fibers in one direction and a member having a cloth material woven with reinforcing fibers. It is preferred that this unidirectional material is disposed at least at a bumper beam rear surface positioned at a vehicle body side so that an extending direction of reinforcing fibers becomes a vehicle width direction. Further, it is preferred to employ a structure wherein the above-described cloth material is disposed with an angle from a vehicle width direction at least at bumper beam front, upper and lower surfaces. In this case, the cloth material may be disposed at the bumper beam rear surface side together with the unidirectional material (in this case, it is not necessary that this cloth material is disposed with an angle from the vehicle width direction). In such a structure, because the unidirectional material, the reinforcing fibers of which extend in the vehicle width direction, is disposed at the bumper beam rear surface side (at a side opposite to a side inputted with a load), this bumper beam rear surface side has high strength and rigidity, when a load is inputted to the front surface side of the bumper beam, it can be achieved that a large deformation does not occur at the rear surface side of the bumper beam. Then, if the front, upper and lower surfaces of the bumper beam are formed only with cloth materials disposed with an angle from the vehicle width direction, it becomes a structure which can be crushed more easily when a load is inputted to the front surface side of the bumper beam. Namely, when a load is inputted to the front surface side of the bumper beam, it becomes possible that a large deformation is not caused at the bumper beam rear surface side as well as the bumper beam is deformed within the cross-section thereof to crush by pressure. As a result, it becomes possible to cause a sequential breakage at the upper, intermediate and lower surfaces of the Θ-shaped cross-section of the bumper beam, and to absorb energy satisfactorily.

Further, in the bumper device for an automobile, it is preferred to employ a structure wherein in each of the above-described bumper extensions, a unidirectional material aligned with reinforcing fibers in one direction is disposed continuously from the above-described bumper beam. In such a structure, the integrality of the bumper beam and the bumper extensions is enhanced, it can be prevented more securely that the bumper beam and the bumper extensions are torn off from each other, and the performance for load transmission from the bumper beam to the vehicle body side through the bumper extensions can be enhanced.

Further, in the bumper device for an automobile, a structure can also be employed wherein in the above-described bumper beam, the above-described unidirectional material is disposed also at a bumper beam front surface so that an extending direction of reinforcing fibers becomes a vehicle width direction. As described above, since it becomes possible to cause a sequential breakage by disposing only cloth materials in the upper, intermediate and lower surface forming portions of the Θ-shaped cross-section of the bumper beam, thereby enabling good energy absorption, high strength and rigidity may be given to the front surface side of the bumper beam by disposition of the unidirectional material, and whereby, it becomes possible to suppress a large deformation of the whole of the bumper beam.

As the reinforcing fibers of the fiber-reinforced resins forming the bumper beam and the bumper extensions, although it is possible to use arbitrary reinforcing fibers such as carbon fibers, glass fibers or aramide fibers, and further, a combination thereof, from the viewpoint of easiness of design and from the viewpoint of providing excellent energy absorption performance while giving high strength and rigidity, it is preferred that at least a part of used reinforcing fibers are carbon fibers.

As the matrix resin of the fiber-reinforced resin, although any of thermoplastic resin and thermosetting resin can be used, in consideration that the bumper device for an automobile is manufactured by mass production, it is preferred to use a thermoplastic resin capable of being easily molded. As usable thermoplastic resins, for example, polyamide, polyphenylene sulfide, polypropylene, polycarbonate, polyetheretherketone and polyetherimide can be exemplified.

Thus, in the bumper device for an automobile, desired strength and rigidity can be given while forming the whole of the device to be light in weight, and when a large load is inputted to the bumper beam, efficient and extremely excellent energy absorption performance can be exhibited by causing a sequential breakage not over the whole but partially within the cross-section.

Hereinafter, examples will be explained referring to figures.

Figure 1B:
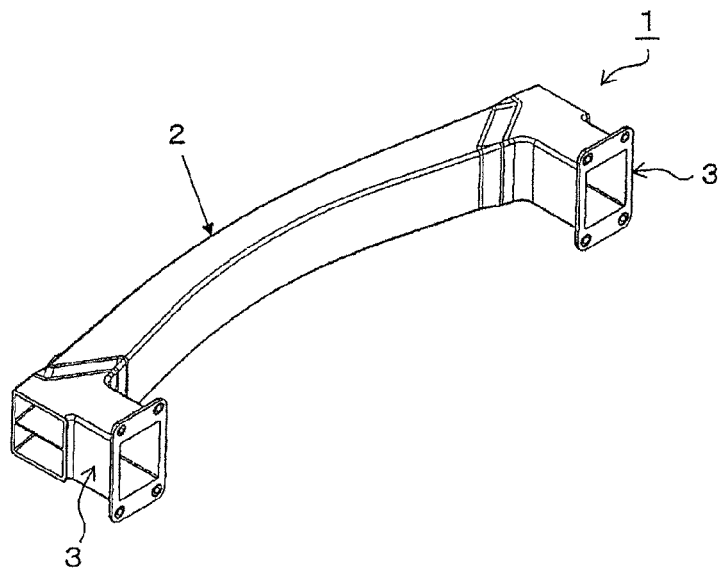
Figure 2A:
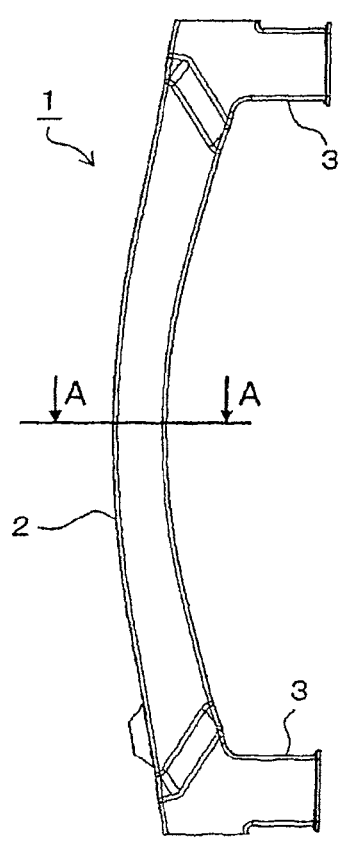
FIG. 2 shows a plan view (A) and an elevational view (B) of the bumper device for an automobile depicted in FIG. 1.
Figure 2B:
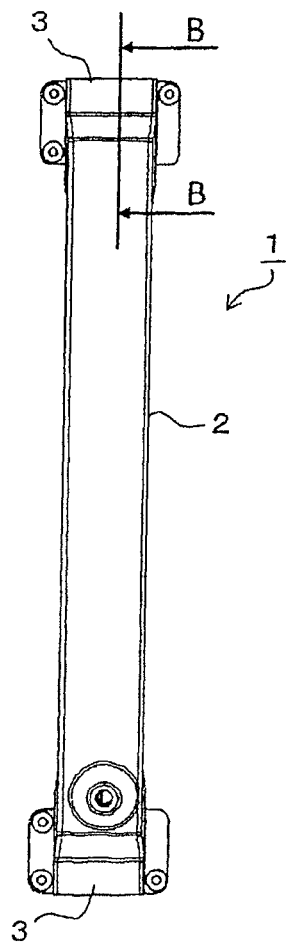
Figure 3:
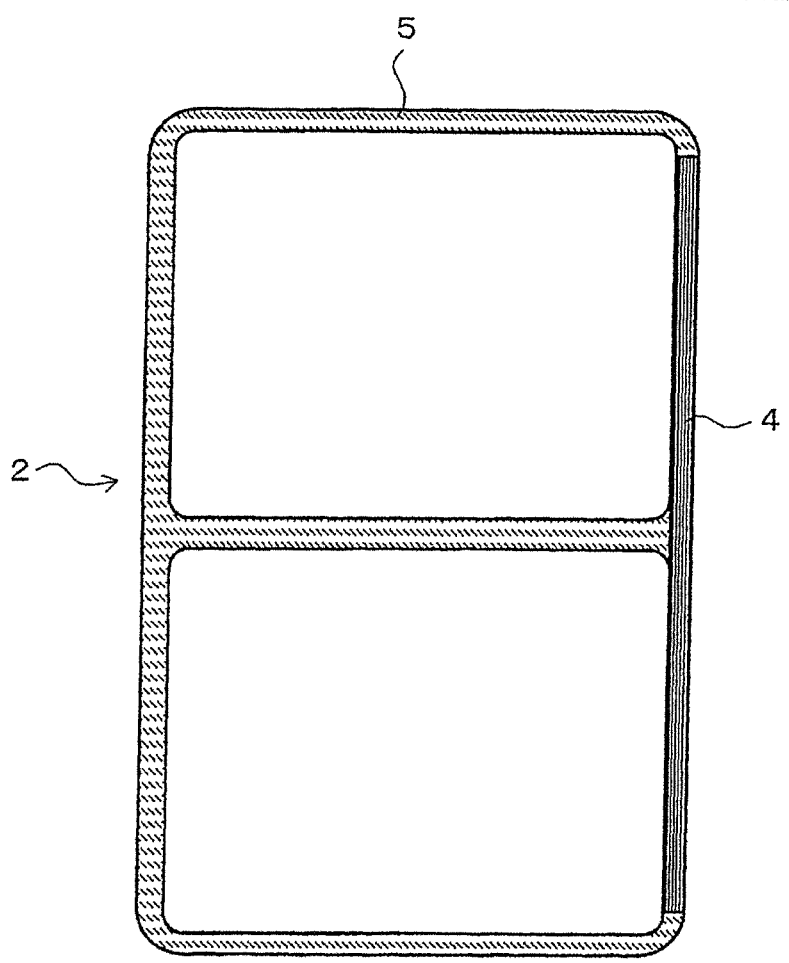
FIG. 3 is a cross-sectional view of the device as viewed along the line A-A of FIG. 2 (A).
Figure 4:
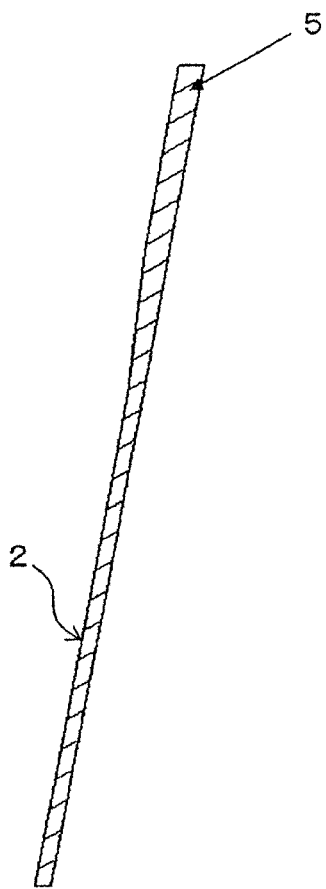
FIG. 4 is a sectional view of the device as viewed along the line B-B of FIG. 2(B).
Figure 4:
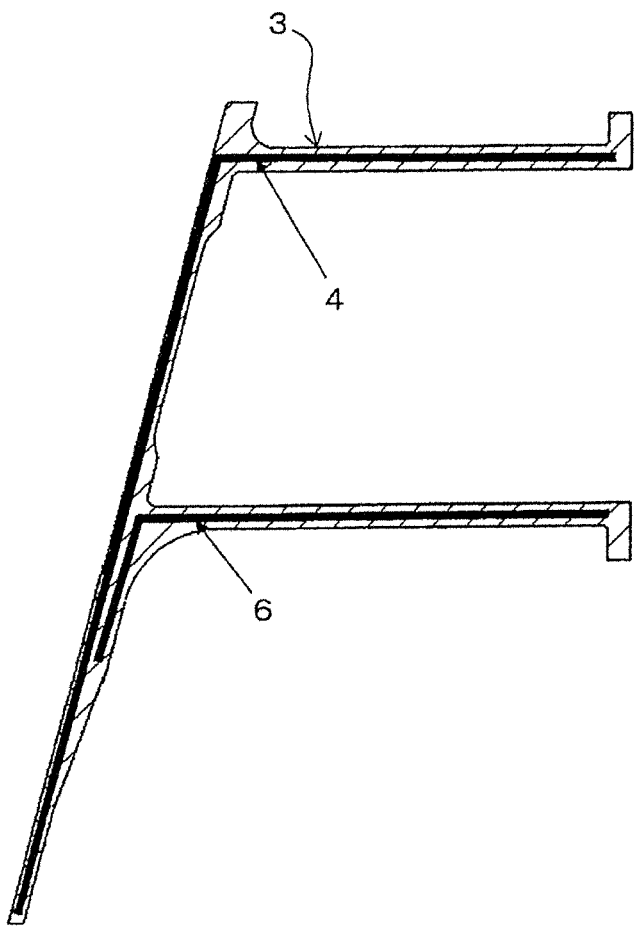

FIGS. 1-4 show a bumper device for an automobile according to an example. As shown in FIGS. 1 and 2, a bumper device for an automobile 1 is formed by a bumper beam 2 which consists of a fiber-reinforced resin (for example, a carbon fiber-reinforced resin) and which extends in a vehicle width direction and bumper extensions 3 which consist of a fiber-reinforced resin (for example, a carbon fiber-reinforced resin) and which are provided at both end portions in the longitudinal direction of the bumper beam 2. The bumper extensions 3 connect to a vehicle body side (for example, to front side members). These bumper beam 2 and bumper extensions 3 are integrally molded. The bumper beam 2 is formed at a Θ-shape in cross-section as shown in FIG. 3 which is a cross-sectional view as viewed along the line A-A of FIG. 2 (A). The portion of each bumper extension 3 shortly extends from the bumper beam 2 toward the vehicle rear side as shown in FIG. 4 which is a sectional view as viewed along the line B-B of FIG. 2(B).

As shown in FIG. 3, the bumper beam 2 having a Θ-shaped cross-section is formed from a unidirectional material 4 aligned with reinforcing fibers in one direction and a member having a cloth material 5 woven with reinforcing fibers. The unidirectional material 4 is disposed at least at a bumper beam rear surface side of the bumper beam 2, which is positioned at a vehicle body side (the vehicle rear side of the bumper beam 2 in FIG. 3) so that an extending direction of reinforcing fibers becomes a vehicle width direction (direction perpendicular to the paper surface of FIG. 3) and, in this example, approximately the whole of the rear surface side portion of the bumper beam 2 is formed from a fiber-reinforced resin reinforced by the unidirectional material 4. Although the unidirectional material 4 is disposed only at the rear surface side of the bumper beam 2 in this example, as aforementioned, it is possible to dispose it also at the front surface side of the bumper beam 2 and to reinforce the front surface side portion in addition to the rear surface side portion. The cloth material 5 is disposed at least at the front surface, upper surface and lower surface forming portions of the bumper beam 2 as a reinforcing fiber material for a fiber-reinforced resin, and the reinforcing fibers of the cloth material 5 are arranged with an angle from the vehicle width direction (direction perpendicular to the paper surface of FIG. 3). For example, the reinforcing fibers of the cloth material 5 are arranged to extend with ±45 degree angles relative to the vehicle width direction. In this example, the cloth material 5 is disposed only at the front surface, upper surface and lower surface forming portions of the bumper beam 2, and it is substantially not disposed at the rear surface side of the bumper beam 2.

The portion of the bumper extension 3 is formed as shown in FIG. 4, and in this bumper extension 3, the unidirectional material 4 aligned with reinforcing fibers in one direction is disposed continuously from the above-described bumper beam 2. Further, as shown in FIG. 4, another unidirectional material 6 is disposed relatively to another portion of the bumper extension 3, and the unidirectional material 6 is also disposed in the extending direction of the bumper extension 3 continuously from the vehicle front side toward the vehicle rear side after being bent from the side of the bumper beam 2.

Figure 5:
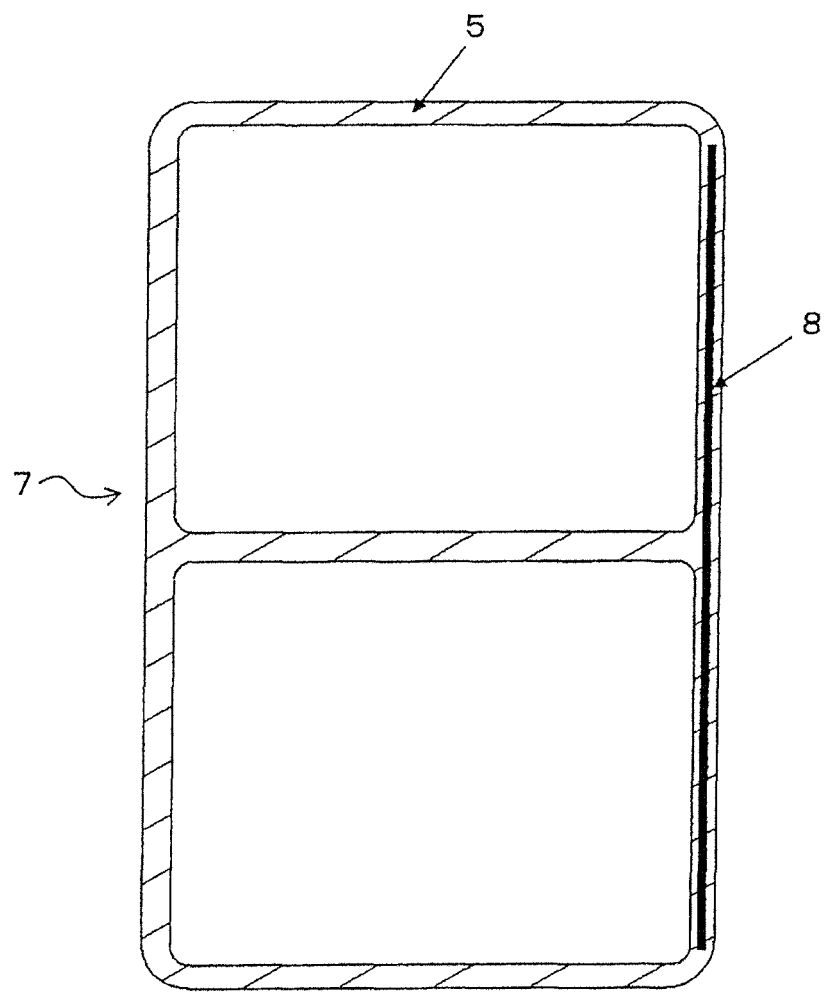
FIG. 5 is a cross-sectional view of a bumper beam according to a modification of FIG. 3.

Although in the structure shown in FIG. 3 the rear surface side portion of the bumper beam 2 is formed substantially only by the unidirectional material 4, as shown with a modification in FIG. 5, a structure may be employed wherein the cloth material 5 is disposed also at the rear surface forming portion of a bumper beam 7, in addition at the front surface, upper surface and lower surface forming portions of the bumper beam 7, and in that rear surface forming portion, a unidirectional material 8 similar to that described above is disposed. In this case, for the cloth material disposed at the rear surface forming portion, the consideration as aforementioned, to be disposed with an angle from the vehicle width direction, is not particularly required.

In the above-described bumper device for an automobile 1, by the structure wherein the bumper device 1 comprises the bumper beam 2, 7 which consists of a fiber-reinforced resin and the bumper extensions 3 which consist of a fiber-reinforced resin, it is lightened in weight as compared with one made of a metal or the like, and by the structure wherein these are molded integrally, high strength and rigidity can be exhibited efficiently as a whole. Therefore, basically, a load having been inputted to the bumper beam 2, 7 is efficiently transmitted to the vehicle body side through the bumper extensions 3 structured integrally with the bumper beam 2, and passenger protection is adequately performed.

Further, when a large load such as an impact load is inputted to the bumper beam 2, 7 which has a Θ-shaped cross-section, by setting the strengths of the respective portions of the Θ-shaped cross-section adequately, it becomes possible to, without causing a large deformation at the rear surface forming portion of the bumper beam 2, 7, make the bumper beam 2, 7 absorb energy efficiently at the upper surface forming portion and the lower surface forming portion of the Θ-shaped cross-section reaching to the rear surface forming portion of the bumper beam 2, 7, and further, at the intermediate surface forming portion of the Θ-shape. In particular, as in the above-described example, by providing the unidirectional material 4, 8, disposed so that the extending direction of reinforcing fibers becomes the vehicle width direction, at the rear surface forming portion of the bumper beam 2, 7, it becomes possible to, without causing a large deformation at the rear surface forming portion of the bumper beam 2, 7, make the bumper beam 2, 7 deform so that the cross-section is crushed, for example, crushed by pressure, at the upper surface, lower surface and intermediate surface forming portions of the Θ-shaped cross-section of the bumper beam 2, 7. In particular, as described above, by forming these upper surface, lower surface and intermediate surface forming portions of the Θ-shaped cross-section only by the cloth material 5 of which the reinforcing fibers extend with ±45 degree angles relative to the vehicle width direction, it becomes possible to proceed with crush by pressure only at these upper surface, lower surface and intermediate surface forming portions of the Θ-shaped cross-section, to cause a sequential breakage at these portions, to perform energy absorption extremely efficiently within the cross-section of the bumper beam 2, 7 itself by the sequential breakage. For example, as exemplified in FIG. 6, when a large load is inputted from the front surface side (the left side of the figure) of the bumper beam 2, 7 having a Θ-shaped cross-section as shown in FIG. 6 (A), as shown in FIG. 6 (B), the crush by pressure is made progress only at the upper surface, lower surface and intermediate surface forming portions of the Θ-shaped cross-section which are lower in strength and rigidity than the rear surface side (the right side of the figure) of the Θ-shaped cross-section, in these portions the sequential breakage accompanying with the progress of the crush by pressure is caused (sequential breakage portions 11), and the energy due to the inputted load can be absorbed efficiently.

Figure 6A:
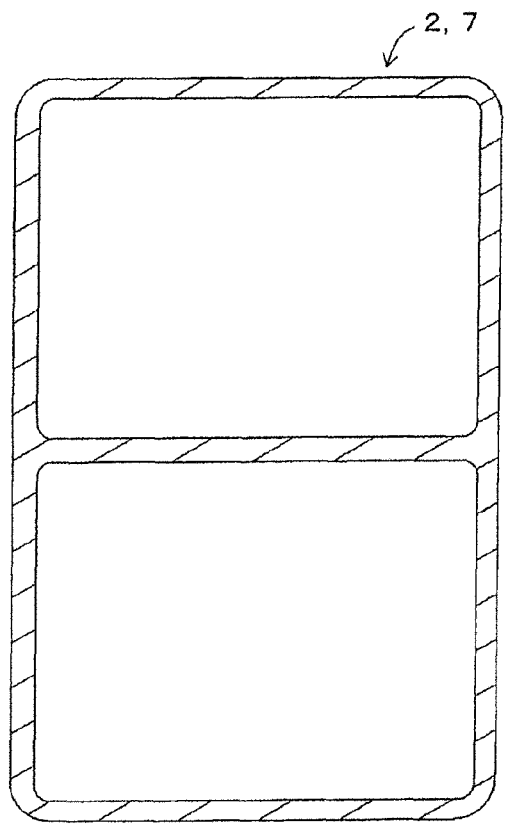
FIG. 6 shows a cross-sectional view before deformation (A) and a cross-sectional view after deformation (B) showing an example of crush by pressure of the bumper beam of the bumper device for an automobile depicted in FIG. 1.
Figure 6B:
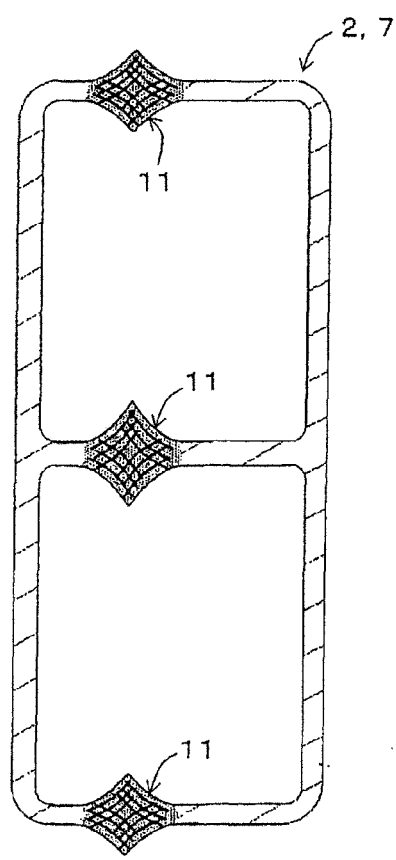

Namely, while appropriately high strength and rigidity as the whole of the bumper device 1 are given, an inputted load is well transmitted to the vehicle body side and the load is received by the vehicle body side having a larger rigidity (for example, by front side members) to enable to adequately protect a passenger, when a larger load such as an impact load is inputted, as shown in FIG. 6 (B), an energy can be efficiently absorbed by the sequential breakage in the specified portions within the Θ-shaped cross-section of the bumper beam 2, 7 itself. Therefore, the functions required as a bumper device for an automobile can be all satisfied.

This disclosure is not limited to the examples shown in FIGS. 1 to 6, and can employ any example within the scope of the appended claims.

INDUSTRIAL APPLICABILITY

The bumper device for an automobile can be applied to any type of automobiles.

The invention claimed is:

1. A bumper device for an automobile comprising a bumper beam consisting of 1) a material comprising resin and reinforcing fibers that are substantially aligned in one direction and 2) a member comprising resin and a cloth woven with reinforcing fibers, and bumper extensions consisting of a fiber-reinforced resin containing bumper extension reinforcing fibers disposed continuously along a length of the bumper extensions, wherein the bumper beam has a Θ-shaped cross-section, the bumper beam and bumper extensions are integrally molded, the bumper extensions extend toward a rear side of the automobile, and in each of said bumper extensions, the material is disposed continuously along the length of the bumper extension from said bumper beam.

2. The bumper device according to claim 1, wherein said material is disposed at least at a rear surface of the bumper beam positioned at an automobile body side so that an extending direction of the reinforcing fibers becomes an automobile width direction.

3. The bumper device according to claim 1, wherein said cloth is disposed at an angle from an automobile width direction at least at bumper beam front, upper and lower surfaces.

4. The bumper device according to claim 1, wherein, in said bumper beam, said material is additionally disposed at a bumper beam rear surface positioned at an automobile body side, and at a front surface of the bumper beam, so that an extending direction of the reinforcing fibers becomes an automobile width direction.

5. The bumper device according to claim 1, wherein at least a part of the bumper extension reinforcing fibers are carbon fibers.

6. The bumper device according to claim 2, wherein said cloth is disposed at an angle from an automobile width direction at least at bumper beam front, upper and lower surfaces.

7. The bumper device according to claim 2, wherein, in said bumper beam, said material is additionally disposed, at a rear surface of the bumper beam positioned at an automobile body side, and at a front surface of the bumper beam, so that an extending direction of reinforcing fibers becomes an automobile width direction.

8. The bumper device according to claim 3, wherein, in said bumper beam, said material is additionally disposed, at a rear surface of the bumper beam positioned at an automobile body side, and at a front surface of the bumper beam, so that an extending direction of reinforcing fibers becomes an automobile width direction.

9. The bumper device according to claim 2, wherein at least a part of the bumper extension reinforcing fibers are carbon fibers.

10. The bumper device according to claim 3, wherein at least a part of the bumper extension reinforcing fibers are carbon fibers.

11. The bumper device according to claim 10, wherein at least a part of the bumper extension reinforcing fibers are carbon fibers.

* * * * *